United States Patent [19]

Stehlin

[11] 3,882,356

[45] May 6, 1975

[54] LEVEL SHIFTER TRANSISTOR FOR A FLUORESCENT LAMP BALLAST SYSTEM

[75] Inventor: Robert A. Stehlin, Richardson, Tex.

[73] Assignee: Texas Instruments Incorporated, Dallas, Tex.

[22] Filed: Dec. 20, 1973

[21] Appl. No.: 426,734

[52] U.S. Cl. ............ 315/205; 315/209 R; 315/291; 315/DIG. 5; 315/DIG. 7

[51] Int. Cl. .................. H05b 41/30; H05b 41/39

[58] Field of Search ...... 315/DIG. 5, DIG. 7, 200 R, 315/205, 208, 209 R, 291, 360, 362; 219/131 R, 131 WR

[56] References Cited

UNITED STATES PATENTS

| | | | |
|---|---|---|---|
| 3,383,557 | 5/1968 | Green et al. | 315/209 R |
| 3,558,998 | 1/1971 | Bertolasi | 219/131 R X |
| 3,648,106 | 3/1972 | Engel et al. | 315/291 |
| 3,781,508 | 12/1973 | Daver et al. | 219/131 R X |

*Primary Examiner*—R. V. Rolinec
*Assistant Examiner*—E. R. LaRoche
*Attorney, Agent, or Firm*—Harold Levine; James T. Comfort; Gary C. Honeycutt

[57] ABSTRACT

An improved arrangement for coupling logic drivers to power devices in a solid-state fluorescent lamp ballast system in which the necessary isolation between the high voltage power devices in the solid-state ballast system and the logic drivers is obtained by using level shifter transistors in which the power switch to be isolated is selected to be a PNP transistor and the transistor for driving and isolating the PNP transistor is an NPN level shifter transistor.

6 Claims, 2 Drawing Figures

LEVEL SHIFTER TRANSISTOR FOR A FLUORESCENT LAMP BALLAST SYSTEM

BACKGROUND OF THE INVENTION

This invention relates to fluorescent lamp ballast systems in general and more particularly to an improved arrangement for providing isolation between high voltage power switching devices in solid-state ballast system and logic drivers used to drive these power switches.

In application Ser. No. 426,784 filed on even date herewith and assigned to the same assignee as the present invention, a solid-state fluorescent ballast system is disclosed in which the AC line voltage is rectified in a full wave rectifier bridge and the rectified voltage then applied across the fluorescent lamp by chopping at a high frequency. A plurality of power switches are used and interposed between the rectified voltage and the lamp. These switches are driven by a trigger source, the output of which will comprise suitable logic drivers. In the system disclosed therein, a first swtich couples the high side of the rectifier output to one side of the lamp. A second switch couples the high side to the other side of the lamp, a third switch couples the low side of the supply to the one side of the lamp and a fourth switch couples the other side of the lamp to the low side of the supply. Two switches at a time are turned on, for example, the first and fourth or the second and third switches to provide a closed circuit for current flow through the lamp. The pairs of switches are alternated at a high frequency, for example, 10,000 Hz with switching signals provided to the switching devices by the logic circuits. Because the first and second switching devices will have a high voltage on their negative terminal when on, they will be near the input potential from the full wave rectifier. The control terminal which will either be the base or the gate will always have a potential that is close to that of the negative terminal which in this case may be as high as 170 volts. Thus, isolation must be provided between the logic driver circuits which are capable of handling only low voltages in the range of 10 to 15 volts and the control terminal of the switch.

The above identified application discloses a number of techniques for obtaining this isolation. It illustrates transformer isolation and opto-electronic isolation. Although both of these techniques are effective, they have disadvantages particularly when it is desired to integrate the complete solid-state ballast system on a single micro-circuit chip. The transformers must be of relatively large size and would need to be external components. Although the opto-electronic system can be integrated, production difficulties may be encountered with this type of structure. Thus, in order to optimize the integration of a solid-state fluorescent lamp ballast system such as that described in the reference application, a means of obtaining isolation without using either transformers or opto-electronic devices is needed.

SUMMARY OF THE INVENTION

The present invention provides such a means in the form of a level shifter transistor. To implement the invention, the power switch which causes the problem is selected as a PNP transistor. Interposed between the PNP transistor and the logic drivé input is an NPN level shifter transistor. The level shifter transistor must have the same voltage handling capabilities as the power switches. However, its current handling capability need not be as great. To minimize this, the power switch PNP transistor rather than being a single transistor can be a Darlington pair.

DETAILED DESCRIPTION OF THE PREFERRED EMBODIMENT

Figure 1:
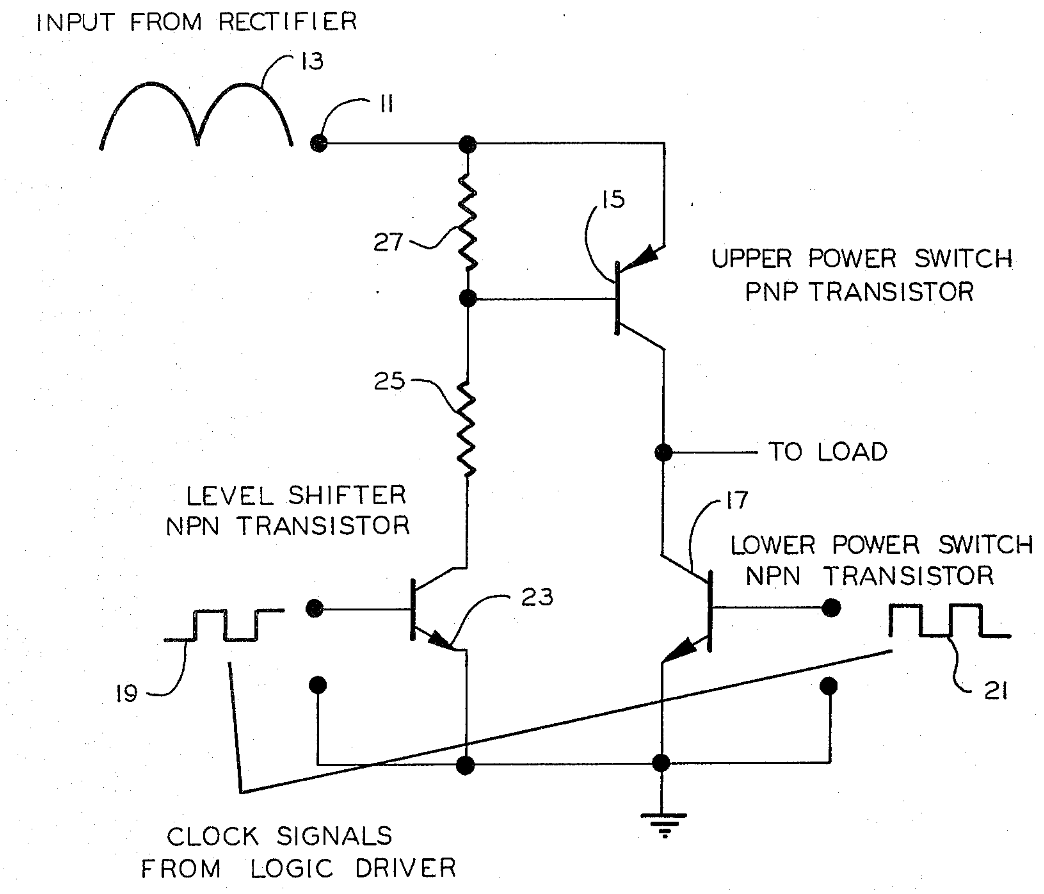
FIG. 1 is a circuit diagram illustrating the arrangement of the level shifter transistor and two of the power transistors used in a circuit according to the present invention.

FIG. 1 illustrates the basic circuit of the present invention. Input power from a rectifier is applied to a terminal 11, the input voltage having a wave-form as indicated by wave-form 13. This voltage is applied to the emitter of a PNP transistor 15 which is in series with an NPN transistor 17. As is described in the above referenced application and will be described more fully below, only one of the transistors 15 and 17 can be on at one time. Thus, when transistor 15 is on, transistor 17 is off and the voltage at the collector of transistor 15 will be near the voltage on its emitter. Because in transistors the base is normally at a voltage near the negative terminal, this high voltage will also appear on the base. As more fully disclosed in the referenced application, switching of the transistors 15 and 17 is accomplished by pulse trains 19 and 21 obtained from logic circuits. These logic circuits only have a low voltage capability and cannot withstand the high voltage which will appear on the base of transistor 15 when it is on. Note that transistor 17 when on will have a voltage on its negative terminal which is near ground and thus the problem does not arise in connection with this transistor.

In order to provide the necessary isolation between the logic circuits supplying the pulse trains 19 and 21 an NPN level shifter transistor 23 is used to drive the transistor 15. It is coupled through resistors 25 and 27 at the junction thereof to the base of transistor 15 to provide, when on, an input signal which will turn on transistor 15. Transistor 23 which is an NPN transistor and has its emitter coupled to ground can have a high voltage on its collector but will always have a voltage close to ground at its emitter and thus, at its base. Even when off, the high voltage will appear only at the collector and not at the negative terminal or emitter which will remain close to ground. Thus, the base will also remain close to ground and the high voltage will not be available thereon to cause damage to the logic driver. Because when off, transistor 23 must withstand the high voltage, it must be selected or designed as a high voltage transistor. However, it carries only a small current, i.e., the current needed to turn on transistor 15 and thus need not have the current capability of transistor 15. Although the switching device 15 is illustrated as a transistor, it may also in some cases be a latch type semiconductor device such as a gate controlled switch or regenerative bi-stable latch similar to those disclosed in the above referenced application. The same problems are present in these types of devices, and the level shifter transistor of the present invention may likewise be employed as a solution to these problems.

Figure 2:
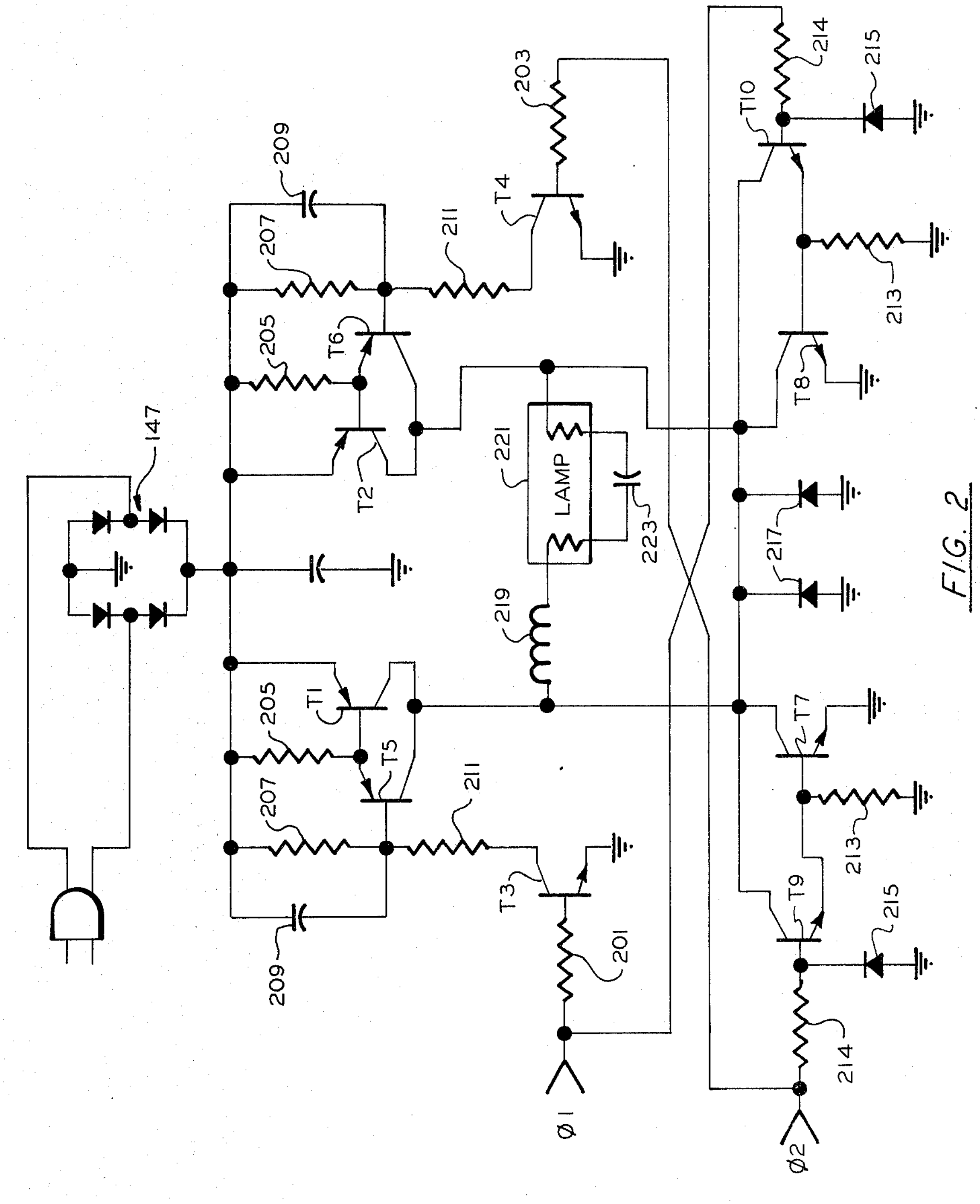
FIG. 2 is a circuit diagram illustrating the circuit of the present invention in an integrated solid-state fluorescent lamp ballast system.

FIG. 2 illustrates a circuit for a solid-state ballast system in which the circuit arrangement of FIG. 1 is employed. The trigger logic circuits are not shown on FIG. 2. These can be constructed as in the above referenced application. A phase one input is provided through a resistor 201 to the base of a transistor designated T3. The phase 2 input is provided through resistor 203 to a transistor T4. These transistors are the above described level shifters which enable the switches to be switched on and off by low logic voltages. Each of the switches at the top of FIG. 2 comprises a Darlington pair. The one switch comprises the pair made up of transistors T1 and T5. The second pair is made up of the transistors T2 and T6. Load resistors 205, biasing resistors 207 and capacitors 209 are suitably provided for each Darlington pair. The outputs of the respective transistors T3 and T4 are coupled to the bases of T5 and T6 through resistors 211. The second set of switches are formed by Darlington pair T7 and T9 and T8 and T10 respectively. Resistors 213 and diodes 215 and 217 are provided in each of the circuits in conventional fashion. The bases of transistors T10 and T9 are coupled respectively to the phase 1 and phase 2 inputs. Since these transistors will never have a very high voltage on their bases, direct coupling to the logic signals is possible. In operation during one-half cycle, the phase 1 signal turns on the Darlington pair comprising T1 and T5 to provide current through the ballast inductance 219 to the lamp 221 and turns on the pair comprising transistors T8 and T10 to provide a return path to ground. During the next half of the high frequency cycle the phase 2 signal will turn on the pair comprising T2 and T6 and the pair comprising T9 and T7.

A capacitor 223 is provided in parallel with the lamp to form a resonant circuit which is required for start-up. The resonant circuit comprising inductor 219 and capacitor 223 should be selected to have a resonant frequency which is near but not at frequency of the high frequency switching signal. This feature is disclosed in more detail in application Ser. No. 426,735 filed on even date herewith. Operation of this series resonant circuit briefly is as follows: The resonance circuit provides sufficient voltage boost to provide a high enough voltage across the lamp for start-up. That is, the voltage from one filament to the other. However, in addition, heater current must be provided to the filaments. This can be done with small transformers, however, it has been found that by placing the capacitor in series with the filaments, the roughly correct average heater current is provided. The inductor 219 then acts during the operation to limit the load current to the desired value. Thus, all the various requirements for the lamp circuit are met.

In the embodiment of FIG. 2, typical values are as follows:

| | | | |
|---|---|---|---|
| Resistor | 205 | — | 62 Ω |
| Resistor | 207 | — | 510 Ω |
| Capacitor | 209 | — | 0.01 uf |
| Resistor | 211 | — | 2K Ω |

| | | | |
|---|---|---|---|
| Resistor | 201 | — | 430 Ω |
| Resistor | 214 | — | 20 Ω |
| Resistor | 213 | — | 150 Ω |
| Inductor | 219 | — | 3.75 mh |
| Capacitor | 223 | — | 0.041 uf |

The figures of inductance and capacitance are for a high frequency input at the phase 1 and phase 2 inputs having a repetition rate of 10,000 pulses per second. These values result in a load circuit which is resonant at a frequency above the frequency of the load excitation. This class of operation secures the necessary voltage boost from operation near resonance without excessive voltage boost and excessive load current at initial start-up which results from operation at resonance.

Thus, an improved arrangement for obtaining isolation between a logic circuit and a high voltage power transistor in a solid-state fluorescent lamp ballast system through the use of a level shifter transistor has been shown. Although a specific embodiment has been illustrated and described, various modifications maybe made without departing from the spirit of the invention which is intended to be limited solely by the appended claims.

What is claimed:

1. In a solid-state ballast system for a fluorescent lamp wherein first and second switching transistors are connected in series across the output of a full wave rectifier, with the connection between said transistors being provided to the lamp, and wherein only one of said transistors is ever on at one time, the switching of said transistors being controlled by logic circuits, which logic circuits are only capable of withstanding a low voltage, means to provide isolation between the logic circuits and said transistors comprising: a level shifter transistor having its emitter grounded and its collector output coupled as a control input to said transistors with the output of one of said logic circuits being coupled to the base of said level shifter transistor.

2. The invention according to claim 1 wherein said level shifter transistor comprises an NPN level shifter transistor.

3. The invention according to claim 2 wherein:

a. said first switching transistor is a PNP transistor having its emitter coupled to the high output of the rectifier; and b. the collector of said NPN level shifter transistor is coupled to the base of said PNP transistor.

4. The invention according to claim 3 wherein the collector of said NPN level shifter transistor is coupled to the high side of said rectifier through first and second series resistors with the base of said PNP transistor coupled to the junction of said resistors.

5. The invention according to claim 3 wherein said first switching transistor is connected in a Darlington pair of PNP transistors.

6. The invention according to claim 3 wherein said second switching transistor comprises an NPN transistor having its collector coupled to the collector of said PNP transistor and its emitter coupled to ground.

* * * * *